(12) United States Patent
Defrancq

(10) Patent No.: US 10,986,764 B2
(45) Date of Patent: Apr. 27, 2021

(54) FRONT LIFTING DEVICE FOR AN AGRICULTURAL MACHINE AND ASSOCIATED CONTROL METHOD

(71) Applicant: Hubert Defrancq, Guignicourt (FR)

(72) Inventor: Hubert Defrancq, Guignicourt (FR)

(*) Notice: Subject to any disclaimer, the term of this patent is extended or adjusted under 35 U.S.C. 154(b) by 611 days.

(21) Appl. No.: 15/739,304

(22) PCT Filed: Jun. 17, 2016

(86) PCT No.: PCT/IB2016/053604
§ 371 (c)(1),
(2) Date: Dec. 22, 2017

(87) PCT Pub. No.: WO2016/207767
PCT Pub. Date: Dec. 29, 2016

(65) Prior Publication Data
US 2018/0184570 A1 Jul. 5, 2018

(30) Foreign Application Priority Data
Jun. 23, 2015 (FR) ...................................... 15 55773

(51) Int. Cl.
*A01B 59/06* (2006.01)
*A01B 63/108* (2006.01)
(Continued)

(52) U.S. Cl.
CPC .......... *A01B 59/068* (2013.01); *A01B 59/048* (2013.01); *A01B 59/064* (2013.01); *A01B 63/108* (2013.01); *A01B 63/1117* (2013.01)

(58) Field of Classification Search
CPC . A01B 59/068; A01B 63/111; A01B 63/1117; A01B 59/048; A01B 59/064; A01B 63/108
See application file for complete search history.

(56) References Cited

U.S. PATENT DOCUMENTS

| 4,715,770 A | 12/1987 | Kryscyk |
| 5,421,416 A * | 6/1995 | Orbach ............... A01B 63/1117 |
| | | 172/3 |

(Continued)

FOREIGN PATENT DOCUMENTS

DE  10 2009 016 571 A1  10/2010
EP  0 182 091 A1  5/1986
(Continued)

OTHER PUBLICATIONS

International Search Report, dated Oct. 5, 2016, from corresponding PCT application No. PCT/IB2016/053604.

*Primary Examiner* — Thomas B Will
*Assistant Examiner* — Joel F. Mitchell
(74) *Attorney, Agent, or Firm* — Nixon & Vanderhye

(57) ABSTRACT

A device for hitching and lifting an agricultural tool, including a frame fastened to the agricultural machine, a first arm articulated on the frame with a first tool hitch at one end, at least one first jack connected at one end to the frame and at the other to the arm, an extent of the travel of the jack allowing the end of the arm for bearing the hitch to successively pass through a first minimum low position, a second maximum high position, and a third retracted position, where a detection unit that detects a position of the end of the arm can deactivate the supply of the jack when the end reaches the second position, and a bypass controller can bypass the controller of the detection unit to reactivate the supply of the jack.

17 Claims, 4 Drawing Sheets

(51) Int. Cl.
*A01B 59/048* (2006.01)
*A01B 63/111* (2006.01)

(56) References Cited

U.S. PATENT DOCUMENTS

| | | |
|---|---|---|
| 5,542,477 A | 8/1996 | Defrancq |
| 5,899,279 A * | 5/1999 | Bennett ............... A01B 63/1117 172/7 |
| 6,230,817 B1 | 5/2001 | Haugen |
| 6,578,641 B2 * | 6/2003 | Bernhardt ............ A01B 59/068 172/439 |
| 8,926,256 B2 | 1/2015 | Defrancq |

FOREIGN PATENT DOCUMENTS

| | | |
|---|---|---|
| FR | 2 688 378 A1 | 9/1993 |
| GB | 2 439 709 A | 1/2008 |
| WO | 2010/049896 A2 | 5/2010 |

\* cited by examiner

FRONT LIFTING DEVICE FOR AN AGRICULTURAL MACHINE AND ASSOCIATED CONTROL METHOD

The present invention relates to the field of technical machines and relates in particular to a device for hitching and lifting an agricultural tool, capable of being mounted to an agricultural machine, and more particularly at the front of the machine. The present invention also extends to the method for controlling such a device.

BACKGROUND OF THE INVENTION

Hitching and lifting devices are designed with a lifting stroke in accordance with the international standard definitions to ensure a proper operation and a compatibility with the different associated tools, including those driven by power take-off.

However, when these tools are not used, it is often desired to be able to retract the arms which extend forwardly in order to reduce their longitudinal offset and to avoid exposing projecting parts of these arms in order to reduce damage in case of frontal impact.

A commonly used solution detailed in document FR 2688378 consists in providing the hitching and lifting devices with foldable arms. However, this solution complexifies and embrittles the structure. In addition, it does not allow an oscillation possibility ensuring tracking the transverse relief while carrying the tool.

Another solution is provided in patent GB2439709 which describes a lower shaft provided with connecting elements that can be locked in two positions: top stroke allowing folding and bottom stroke corresponding to the operating mode of lifting with tools. In addition, an assistance actuator enables the movement, without physical effort, of the lower shaft when switching from the bottom stroke mode to the top stroke mode. However, this solution has two significant limits:
  the axes should be unlocked to switch from one position to the other and this operation can be made delicate because of alignment clearances or axis seizures in their support;
  this solution does not solve the problem of operation of the hitching and lifting devices with arms allowing a transverse oscillation movement while carrying the tool.

Document EP 0182091 describes a front hitching and lifting device for a tractor in which, in a working position, each arm is connected to a lever, controlled by a actuator using a substantially vertical connecting rod, the length of which can be manually adjusted. When no tool is carried by lifting, it is possible to release the connecting rod of the lever and to lift the arm in a substantially vertical erased position. All these operations have to be manually made and consume time.

Document WO2010/049896 describes a front hitching and lifting device including a first and a second actuator "in series" and coaxial to each other. Switching from the hitching position to the working position is made by extending the first actuator whereas switching from the working position to the retracted position is made by extending the second actuator. This solution, although of a high performance, has some cost because it doubles the number of actuators and furthermore requires coordination in supplying each of the actuators, in order to allow only predefined switchings position.

That is why, the invention provides a front hitching and lifting device which is both simpler, and thus cheaper, and more reliable.

SUMMARY OF THE INVENTION

More precisely, one object of the invention is a device for hitching and lifting a tool, capable of being mounted to an agricultural machine, comprising:
  a chassis intended to be attached to the agricultural machine,
  at least one first arm hinged to the chassis and provided at one of the ends thereof with a first means for hitching the tool;
  at least one first actuator one of the elements, cylinder or rod, of which is connected to the chassis whereas the other element, rod or cylinder, is connected to the arm, said actuator enabling the movement of the arm to be ensured such that the actuator stroke extent enables the end of the first arm provided with the hitching means, to successively sweep across a first position called a "minimum bottom position", a second position called a "maximum top position" and a third position called a "retracted" position,
  means for supplying the actuator,
  means for detecting the position of the end of the arm which are able to deactivate the means for supplying the actuator, when the end of the arm has reached the second position,
  a by-pass control able to activate the means for supplying the actuator, when said means are deactivated by the means for detecting the position of the end of the arm.

According to some embodiment, the means for detecting the position of the end of the arm include an induction sensor.

Alternatively, the means for detecting the position of the end of the arm comprise an angular position sensor.

According to a preferential embodiment, the by-pass control is a switch with two positions, one of which is unstable.

The supply means can comprise a hydraulic distributor connected to each of the chambers of the first actuator using a line, as well as a first valve interposed in the line connected to the chamber the supply of which allows switching from the hitching position to the retracted position, closing said valve being driven by the means for detecting the position of the end of the arm and its opening by the by-pass control.

The hydraulic distributor can be manually controlled from the cabin, the by-pass control knob being thereby preferentially in the proximity thereof. The supply means can comprise a hydraulic distributor connected to each of the chambers of the first actuator by means of a line, said distributor being controlled by a control unit slaved to the detecting means and the by-pass control.

The actuating knob of the by-pass control can thereby be preferentially integrated to the board of the control unit.

The raise in the retracted position can thereby be preferentially made by concomitantly actuating the by-pass control knob and the raise knob of the control of the control unit.

Furthermore preferentially, the concomitant actuation of the by-pass control knobs and of the control unit, is made with both hands of the user, each of the hands being dedicated to a single control knob.

The device for hitching and lifting a tool advantageously comprises a second arm extending in a plane substantially parallel to the plane in which the first arm extends, said second arm being hinged to the chassis and including at one end thereof a second means for hitching the tool, as well as a second actuator the stroke extent of which enables the end of the second arm provided with the second hitching means to successively sweep across the first position called the "minimum bottom position", the second position called the "maximum top position" and the third position called the "retracted" position.

Advantageously, a single pressurised fluid distributor supplies the first and second actuators in parallel by means of a first and a second line each being divided in two to end respectively in the chamber the supply of which enables switching from the minimum bottom position to the retracted position of the first and second actuators, and in the chamber the supply of which enables switching from the retracted position to the minimum bottom position.

According to a first embodiment, the first valve is disposed between the division in two and the distributor, such that closing the valve by the means for detecting the position of the end of the arms which are able to deactivate the supply means stops the supply to both actuators.

According to an alternative embodiment, the first valve is disposed in the line divided in two leading to the chamber the supply of which enables switching from the minimum bottom position to the retracted position of the first actuator, whereas a second valve is disposed in the other line divided in two, said second valve being driven by second means for detecting the position of the end of the second arm and its opening by the by-pass control.

Another object of the invention is to provide a method for controlling a device for hitching and lifting an agricultural tool being capable of being mounted to an agricultural machine, the device comprising:
  a chassis intended to be attached to the agricultural machine,
  at least one first arm hinged to the chassis and provided at one of the ends thereof with a first means for hitching the tool;
  at least one first actuator one of the elements, cylinder or rod, of which is connected to the chassis whereas the other element, rod or cylinder, is connected to the arm, said actuator enabling the movement of the arm to be ensured such that the actuator stroke extent enables the end of the first arm provided with the hitching means, to successively sweep across a first position called a "minimum bottom position", a second position called a "maximum top position" and a third position called a "retracted" position,
  means for supplying the actuator,
  means for detecting the position of the end of the arm which are able to deactivate the means for supplying the actuator,
  a by-pass control for controlling the detecting means able to activate the means for supplying the actuator,
  characterised in that the means for detecting the position of the end of the arm deactivate the means for supplying the actuator in the direction of the retracted position, as soon as, coming from the minimum bottom position, the maximum top position is reached, reactivating the means for supplying the actuator in the direction of the retracted position being operated by actuating at least the by-pass control.

Advantageously, reactivating the means for supplying the actuator in the direction of the retracted position is operated by concomitantly actuating the control of the means for supplying the actuator in the direction of the retracted position.

Furthermore preferentially, reactivating the means for supplying the actuator in the direction of the retracted position is operated by actuating in parallel the control of the means for supplying the actuator and the by-pass control, through the use of each of the user's hands.

The means for supplying the device can comprise a hydraulic distributor connected to each of the chambers of the first actuator by means of a line, as well as a first valve interposed in the line connected to the chamber the supply of which enables switching from the minimum bottom position to the retracted position, characterised in that closing said valve occurs when an angular sensor, detects that the end of the arm carrying the hitching means has reached the maximum top position or when an induction sensor, detects that the actuator stroke has reached a calibrated value as being the maximum top position of the end of the arm, opening said valve being operated by actuating the by-pass control, preferentially made by a switch with two positions, one of which is unstable.

The means for supplying the device can comprise a hydraulic distributor connected to each of the chambers of the first actuator by means of a line, said distributor being controlled by a control unit, triggering deactivating the supply of the line connected to the chamber the supply of which enables switching from the minimum bottom position to the retracted position, when it receives a signal from an induction sensor about the actuator stroke or a signal from an angular sensor about the position of the end of the arm, the control unit resetting activating said supply when the by-pass control is activated, the latter being preferentially made of a switch with two positions, one of which is unstable.

BRIEF DESCRIPTION OF THE DRAWINGS

Further advantages and features of the invention will appear upon reading the detailed description of implementations and embodiments in no way limiting, and of the following appended drawings.

DETAILED DESCRIPTION OF THE PREFERRED EMBODIMENTS

The appended drawings will not only possibly be used to complete the invention, but also contribute to define it, optionally.

The embodiments described hereinafter are in no way limiting, in particular alternatives of the invention only comprising a selection of described characteristics, isolated from other described characteristics will in particular be possibly considered.

For the sake of brevity, the same elements represented in different figures bear a single reference.

Figure 1C:
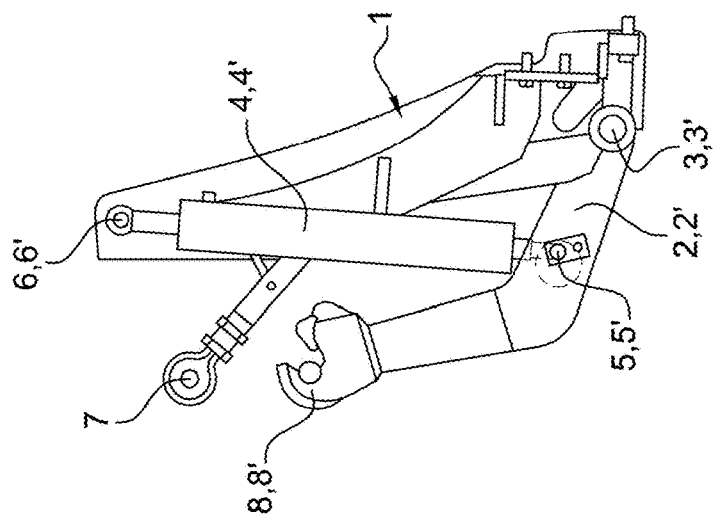
FIG. 1C illustrates a profile view of a hitching and lifting device in a position called a "retracted" position.
Figure 1B:
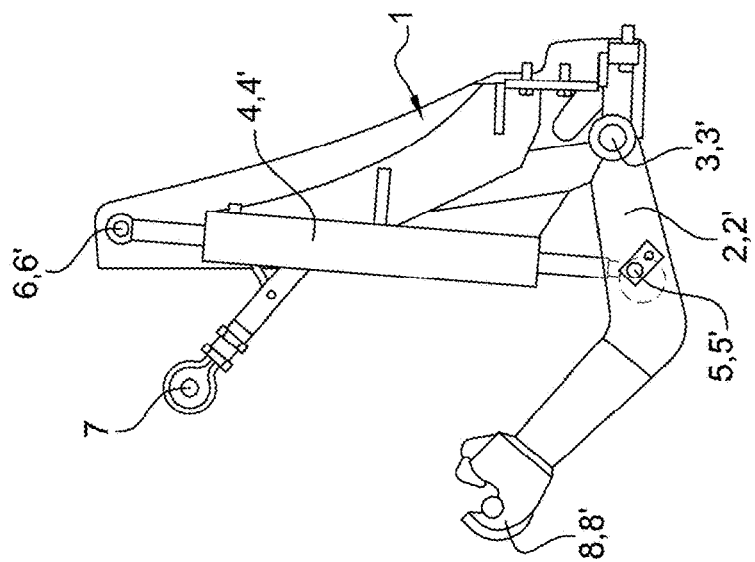
FIG. 1B illustrates a profile view of a hitching and lifting device in a position located between the position called a "minimum bottom position" and the position called a "maximum top position"
Figure 1A:
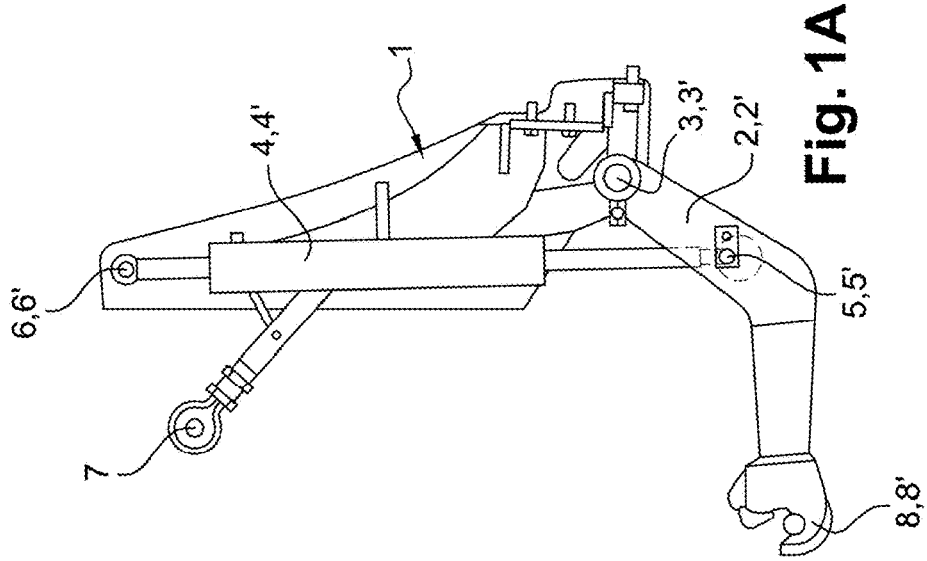
FIG. 1A illustrates a profile view of a hitching and lifting device in a position called a "minimum bottom position"
Figure 2:
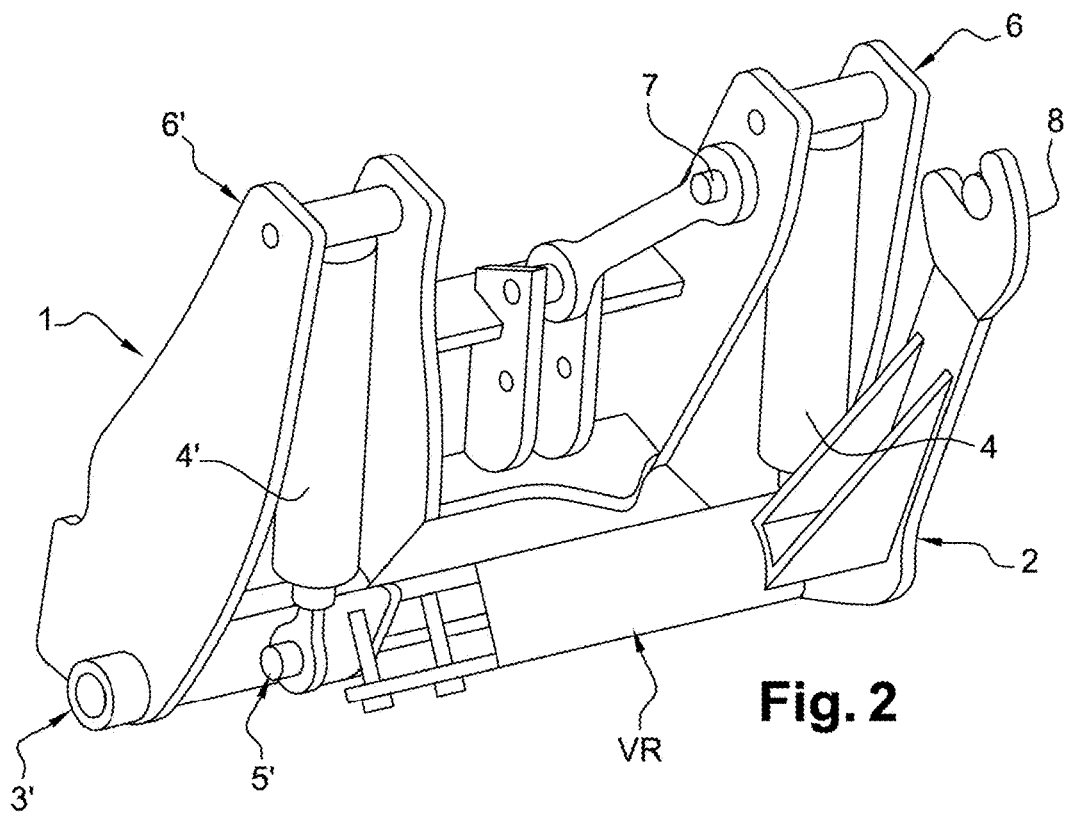
FIG. 2 is a perspective and three-quarter front view of a hitching and lifting device in the so-called "retracted" position.

As represented in FIGS. 1A to 1C, a front hitching and lifting device for an agricultural machine, such as a tractor can be seen, comprising a chassis 1 capable of being mounted fixed to the front part of a tractor, and two lower hitching arms 2 and 2', extending in planes parallel to each other respectively. Each arm is pivotably mounted about a hinge axis 3, 3' provided at the bottom part of the chassis 1. Each of the arms is actuated by a actuator 4, 4' such that the full actuator stroke enables the end of the arm carrying the hitching means 8, 8' to successively sweep across positions (see FIGS. 1A and 1B) ranging from a first position called a "minimum bottom position" to a second position called a "maximum top position" and to go beyond the maximum top position to reach a third position called a "retracted" position (see FIG. 1C).

By "minimum bottom position", it is meant the lowest permissible position by the hitching means. Generally, the hitching and lifting devices assume a minimum bottom position which quite simply enables the possible choice range for the working and hitching positions to be widened.

By "maximum top position", it is meant the highest permissible position by the hitching means, when the latter operate according to a working position. In other words, the working position that can be adopted by the hitching means when connected to a tool, is necessarily located between the minimum bottom position and the maximum top position. Therefore, the working position corresponds to an intermediate position in which the agricultural tool being hitched is at the suitable height to exert its function.

By "retracted position", it is meant the position of the hitching means, in which the arm(s) is (are) folded against the chassis. This position goes beyond the maximum top position.

Each of the actuators is attached at one component thereof to the chassis and at the other of its components to the arm dedicated thereto. As represented in FIGS. 1A, 1B, 1C and 2, the rods of the actuators 4 and 4' are respectively connected to the arms 2 and 2' by hinge axes 5, 5', whereas the barrel of the cylinder of said actuators is connected to the top part of the chassis 1 through hinge axes 6, 6'.

The arms 2, 2' are bent, with an obtuse angle, with their convexity pointed 30 downwardly. The actuator rod is attached to the part of the arm located between the hinge 3, 3' on the chassis and the arm bend. The hinge axes 5, 5' of the rods on the arms are located, in the example being considered, forwardly (in the normal direction of advance of the tractor) of the hinge axes 3, 3' of the arms on the chassis. Alternatively, the arms could extend rearwardly of the axes 3, 3' and the rods could be connected to the arms rearwardly of the axes 3, 3'; in this case, the device would be consequently suitable to the direction reversal, the arm raise being achieved by exiting the rod, and the descent by entering the rod in its cylinder.

An upper point 7 with a connecting rod enables the hitched tool to be secured in a further harnessing point.

Figure 3A:
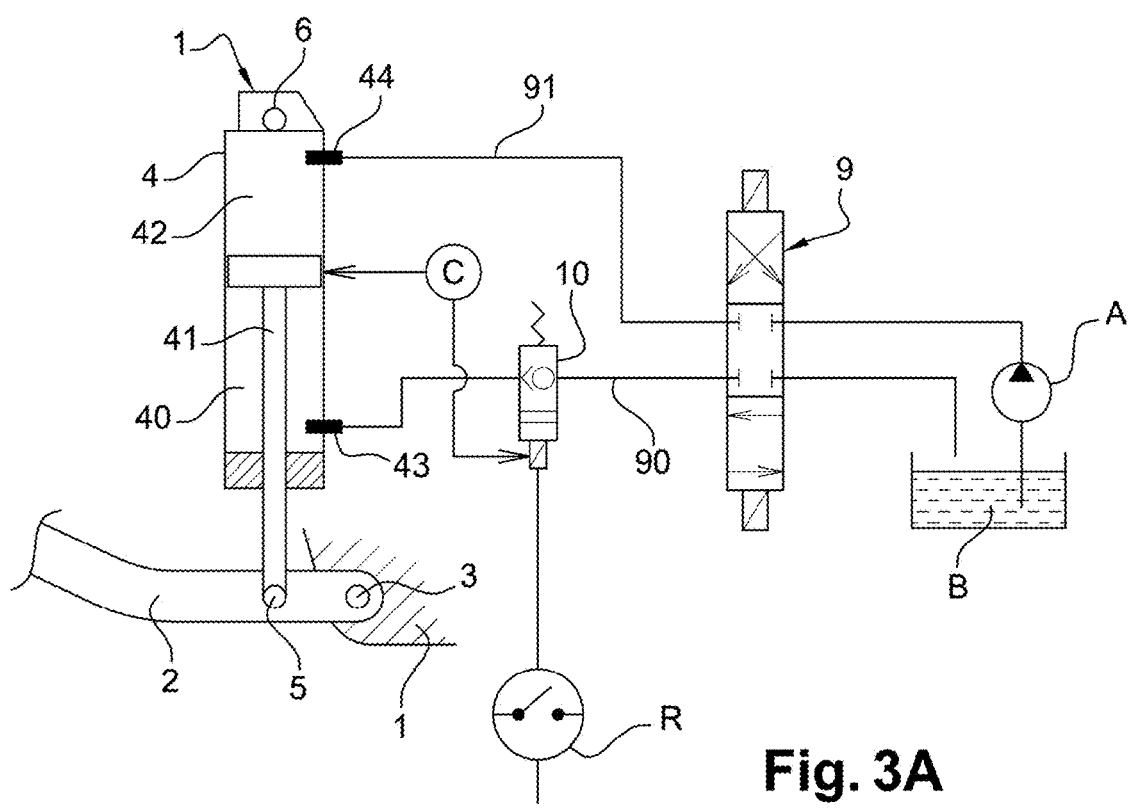
FIG. 3A is a schematic view of the device according to a first embodiment of the invention.

FIG. 3A represents a block diagactuator of a hitching and lifting device according to one embodiment of the invention. There is a first actuator 4 which is hinged on the rod side about an axis 5 of a first arm 2 and hinged on the cylinder barrel side about an axis 6 of the chassis. The actuator 4 is provided with a piston-rod assembly 41 able to be translated in a cylinder the space of which is divided into a first chamber 40 on the rod side and a second chamber 42 on the cylinder barrel side. The first and second chambers are each provided with an aperture 43, 44 connected thanks to a first 90 and a second 91 lines, to supply means 9, 10. The apertures 43, 44 are located in a zone corresponding to the minimum chamber volume, so as to enable to be more fully discharged and a working volume to be optimised therefore.

Advantageously, the actuator 4 is a "dual effect" hydraulic actuator, supplied by a four-way distributor 9, in turn supplied with pressurised oil from the engine circuit of the agricultural machine. A valve 10 is disposed in the line 90 enabling the chamber 40 to be supplied, that is the chamber the oil filling of which leads to the so-called "retracted" position. The valve 10 is in an "open" position to enable the chamber 40 to be supplied when the distributor is actuated. In other words, the chamber 40 can be placed at the intake or exhaust depending on the distributor state.

According to the invention, the device comprises detecting means C able to identify the position of the end of the arm and to deactivate the supply of the chamber 40 by sealing the valve 10, as soon as, coming from a position located between the minimum bottom position and the maximum top position, the maximum top position is exceeded. However, the valve 10 only seals the chamber for intake and not for exhaust. The aim is indeed to be able to go down again to a position lower than the maximum top position. When the line of the chamber the supply of which enables the maximum top position to be accessed is placed to exhaust, the valve is again placed in the open position.

Still according to the invention, the device comprises a by-pass control R capable of deactivating the sensor control. In other words, actuating the by-pass control R opens again the valve 10 which sealed the line 90, so as to enable the chamber 40 to be supplied in order to reach the "retracted" position.

Advantageously, the detecting means C can consist of an induction sensor able for example to determine the piston stroke in the cylinder, said sensor directly or indirectly driving the closing of the valve when the signal it receives is positive.

The detecting means C could also advantageously consist of an angular sensor able for example to determine the angular variation swept across by the arms, said sensor directly or indirectly driving the closing of the valve when the signal received is positive.

The valve 10 is in turn advantageously a one-way valve the sealing of which by the means C is only made towards the chamber 40, such that discharging said chamber is still possible and therefore does not require any intervention of the by-pass control.

The by-pass control R is advantageously a switch and preferentially a switch with two positions, one of which is unstable.

Figure 3B:
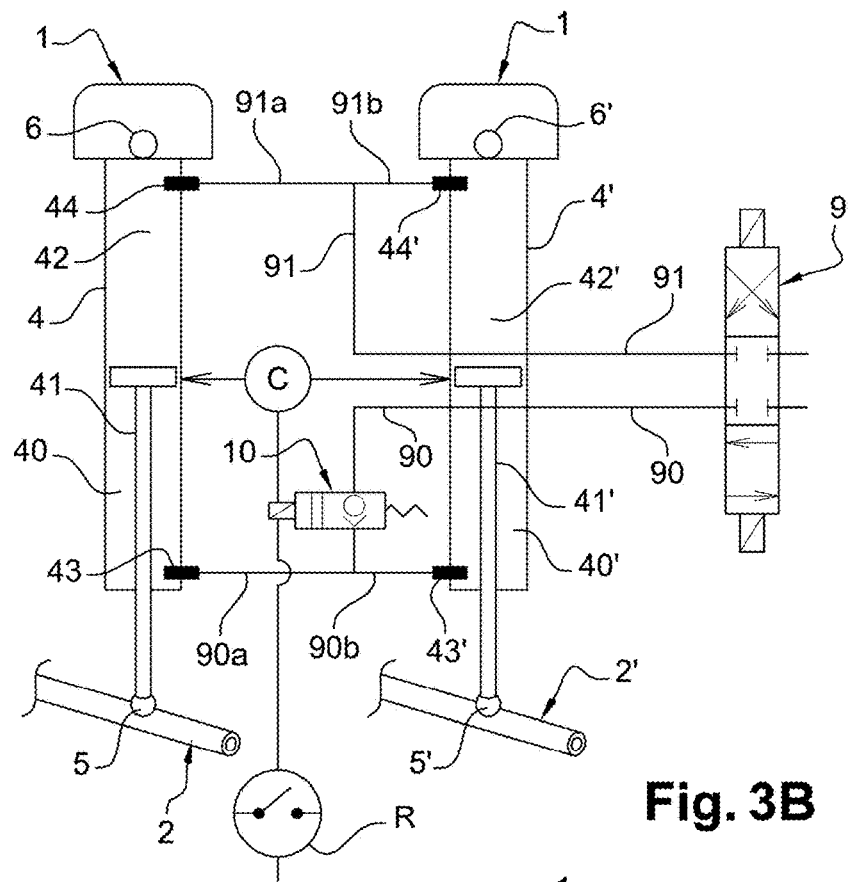
FIG. 3B is a schematic view of the device according to a second embodiment of the invention.

FIG. 3B represents a scheme for making a hitching and lifting device according to another embodiment comprising a first 2 and a second 2' arms each actuated by a first 4 and a second 4' actuator. Mounting and hinging the second arm 2' to the chassis 1 are similar to mounting and hinging the first arm 2. Supply and actuation of the second actuator are also similar to supply and actuation of the second actuator.

FIG. 3 shows again a first actuator 4 hinged on the rod side about an axis 5 of a first arm 2 and hinged on the cylinder barrel side about an axis 6 of the chassis as well as a second actuator 4' hinged on the rod side about an axis 5' of a second arm 2' and hinged on the cylinder barrel side about an axis 6' of the chassis. The actuators 4 and 4' are each respectively provided with a piston-rod assembly 41, 41' able to be translated in a cylinder the space of which is divided into a first chamber 40, 40' on the rod side and a second chamber 42, 42' on the cylinder barrel side. The first and second chambers are each provided with an aperture 43, 44, 43', 44' connected thanks to a first 90a, 90b and a second 91a, 91b line, to supply means 9, 10. The lines 90a and 90b of the first chambers of both actuators are joined in a single line 90 thus enabling the first chambers to be supplied on a single way of the distributor 9. Likewise, the lines 91a and 91b of the first chambers of both actuators are joined in a single line 91 thus enabling the first chambers to be discharged on a single way of the distributor 9.

According to this embodiment, there is only one valve 10 disposed upstream of the division in two of the line 90 into the lines 91a and 91b respectively leading to each first chamber 40, 40'. The valve 10 is in an "open" position to enable the chamber 40 to be supplied when the distributor is actuated. In this way, sealing the valve 10 deactivates the supply of the first chambers and stops simultaneously the stroke of each actuator. Still according to the invention, the device comprises a by-pass control R again opening the valve 10 which sealed the line 90, and thus the entire supply of the first and second actuators.

This embodiment enables the ends of the arms to be synchronously moved. In this way, the hitching means can carry a tool such that it extends above the ground horizontally. In order to fasten securely the position of the arms one with respect to the other, a detachable locking plate VR (FIG. 2) can connect them rigidly.

Figure 3C:
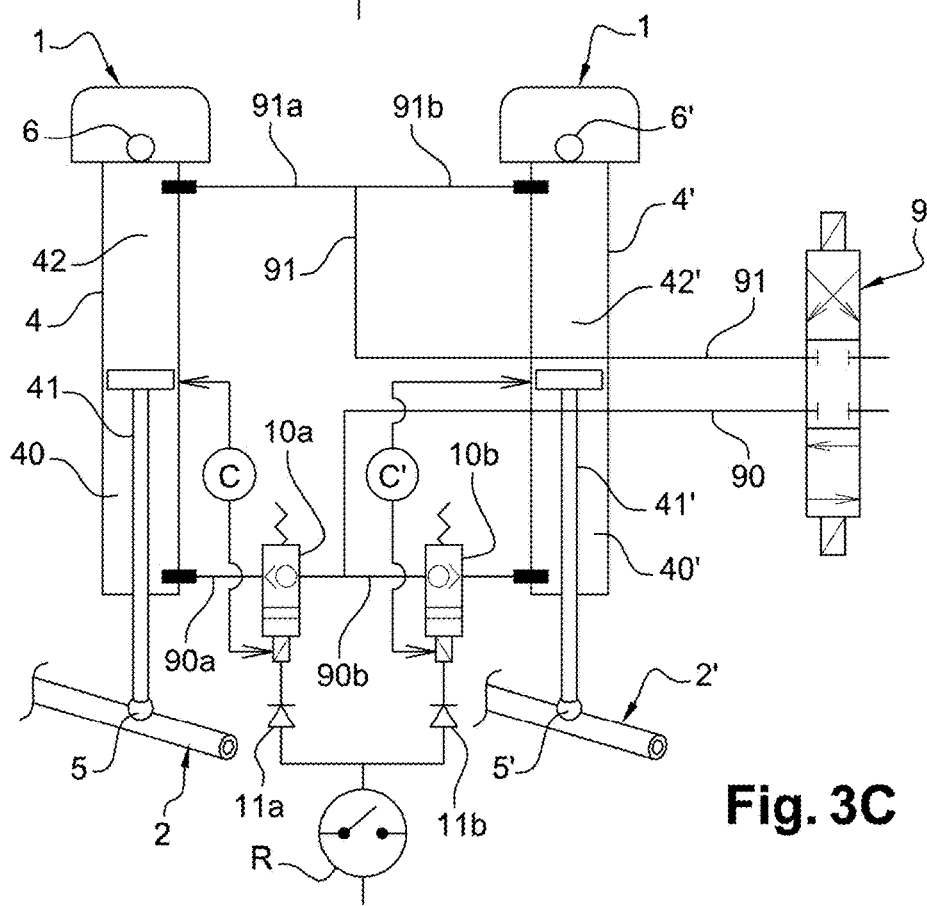
FIG. 3C is a schematic view of the device according to a third embodiment of the invention.

In order to allow side oscillation enabling a relief tracking while carrying the tool connected to lifting by means of hitching hooks 8, 8' and of the third upper point 7 with a connecting rod, it is necessary to resort to an alternative represented in FIG. 3C. To do this, it is necessary to detach the locking plate VR. This alternative differs from the first one in that a first and a second valve are interposed in each of the lines 90a, 90b respectively leading to the first chamber of each of the actuators. Each of the valves 10a, 10b is slaved by an own detecting means C, C' that can consist of a sensor determining the actuator stroke or the angular variation swept across by the arm with which it is associated. Thereby, closing the valves occurs in a dissociated manner, and more precisely when each of the arms has reached its own maximum top position.

Advantageously, diodes 11a, 11b are inserted to preserve the independent operation of the valves upon reaching the maximum top position. In other words, these diodes enable the valves 10a, 10b to be isolated from each other, these valves being besides connected to a same terminal of the unstable two-position switch.

As regards the hydraulic distributor, it can be driven by a manual control or by a control unit.

In the case where the distributor 9 is controlled by a control unit, the user can drive the actuation of the actuator(s) from his/her cabin, without having to get off his/her tractor.

The actuation knob of the by-pass control can thereby be integrated to the control board of the control unit. The raise in the retracted position is thereby made preferentially by concomitantly actuating the knob of the by-pass control and the raise knob of the control unit. To ensure that this double actuation is a voluntary action from the user, it is advantageous to configure the control board, such that the concomitant actuation of the knobs requires both user's hands.

Figure 4:
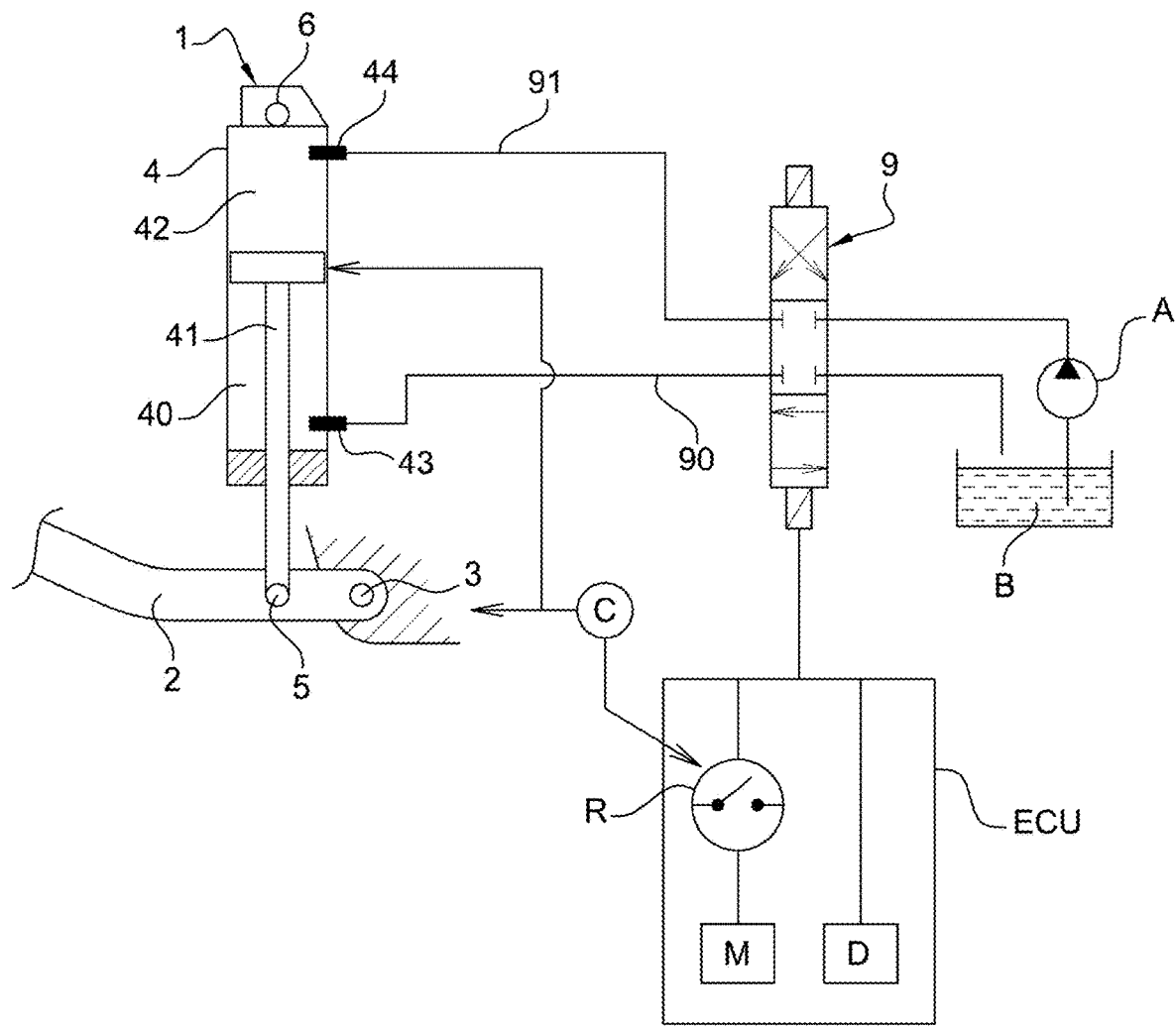
FIG. 4 is a schematic view of the device according to a fourth embodiment of the invention.

Driving the distributor by a control unit is detailed in FIG. 4. There is a first actuator 4 hinged on the rod side about an axis 5 of a first arm 2 and hinged on the cylinder barrel side about an axis 6 of the chassis. The actuator 4 is provided with a piston-rod assembly 41 able to be translated in a cylinder the space of which is divided into a first chamber 40 on the rod side and a second chamber 42 on the cylinder barrel side. The first and second chambers are each provided with an aperture 43, 44 connected by virtue of a first 90 and a second 91 lines, to supply means 10. The apertures 43, 44 are located in a zone corresponding to the minimum chamber volume, so as to enable the chamber to be more fully discharged and thus a working volume to be maximised.

Advantageously, the actuator 4 is also a "dual effect" hydraulic actuator, supplied with a four-way distributor 9, in turn supplied with pressurised oil from the engine circuit of the agricultural machine.

According to the invention, the device comprises detecting means C capable of identifying the position of the end of the arm and deactivating the supply of the chamber 40 by the control unit ECU which actuates the distributor in the neutral position, as soon as, coming from an intermediate working position, the maximum top position is exceeded.

Still according to the invention, the device comprises a by-pass control R integrated to the control unit ECU and capable of forcing the distributor position into the supply position. In other words, the actuation of the by-pass control R concomitant with the supply actuation (represented by the knob M) enable the retracted position to be accessed.

Advantageously, the detecting means C can consist of an induction sensor able for example to determine the piston stroke in the cylinder, said sensor directly or indirectly driving the closing of the valve when the signal it receives is positive.

The detecting means C can also advantageously consist of an angular sensor able for example to determine the angular variation swept across by the arm, said sensor directly or indirectly driving the closing of the valve when the signal received is positive. It will be noted that this configuration enables a control unit (ECU) not to be necessarily resorted to.

The by-pass control R is advantageously a switch and preferentially a switch with two positions, one of them being unstable.

As is clearly apparent from FIG. 4, it is no longer necessary to resort to a valve driven by the sensor as in the previous embodiments. Yet, it is necessary to conduct a calibration step beforehand. In this case, the sensor is capable of reading the full lifting stroke. In this case again, the maximum permitted stroke corresponding to the maximum top position, is defined as being a fraction of the full stroke. The operation, including in a manual mode, is then dependent on the calibration phase.

During the calibration phase, the actuator is actuated during the raise and descent to said "retracted" and "minimum bottom" positions. This step enables the useful sensor range to be validated, said range being thereby limited upwards for a stroke corresponding to the maximum top position, that is for example 80% of the full stroke which, in turn, corresponds to the retracted position. Of course, when the sensor value, corresponding to the maximum top position, is reached, the distributor is configured in a neutral position and the lifting stroke is stopped.

The advantage of this embodiment is that it enables the distributor opening to be proportionally managed, said proportional management enabling a flexible operation at the end of the stroke.

To access the retracted position, it is then suitable to actuate the by-pass control which enables the distributor opening to be activated beyond the maximum top position while simultaneously and continuously actuating the supply control of the distributor.

This stroke between the maximum top position and the retracted position can be achieved with an opening of the supply distributor different from that used for achieving the intermediate working positions, in order to control the rate for switching into the retracted position.

By way of alternative, it can be contemplated to use two sensors rather than a single one in order to further secure the device. Indeed, in the case where one of the sensors would come to be misadjusted or would be failing (faulty reading of inputs or even offset or random behaviour with respect to the stored reference data), only the sensor behaviour which would have remained consistent will be taken into account.

In the case where the hitching and lifting device is provided with an oscillation device as described in document FR2649580 and incorporated in reference, this device enables both arms to be raised and lowered along different strokes. However, since the distributor is common to the supply of the actuators of each arm, reaching the maximum top position by one of the arms is similar for the other, even if the maximum top position of the other arm is not reached. Indeed, supplying the distributor is deactivated for both arms.

To overcome this drawback, it is possible to reintroduce a valve driven for each actuator.

It is also possible to introduce a second distributor, such that there is a distributor dedicated to each actuator, each of the distributors having its own management. However, this alternative is rather expensive and it is suitable to ensure a permanent synchronisation of the flow rates of both parallel supply distributors to allow a dynamic operation without side drift of the height of the lifted tool.

Of course, the invention is not limited to the examples just described and numerous variations could be provided to these examples without departing from the scope of the invention. Furthermore, the different characteristics, forms, alternatives and embodiments of the invention can be associated with each other according to various combinations insofar as they are not compatible or exclusive to each other.

Thus, the hitching and lifting device could for example include a control unit inside the machine cabin enabling the user to actuate the device between the minimum bottom position and the maximum top position from his/her cabin, and external manual controls thereby dedicated to driving the device between the maximum top position and the retracted position.

Furthermore, the hitching and lifting device could for example include two arms actuated by one and a single acting actuator.

The invention claimed is:

1. A device for hitching and lifting a tool, capable of being mounted to an agricultural machine, comprising:
    a chassis (1) to be attached to the agricultural machine;
    an arm (2) hinged to the chassis and including, at an end of thereof, a hitching means (8) for hitching the tool;
    an actuator (4) comprised of a cylinder and rod, a first one of said cylinder and rod connected to the chassis, and a second one of said cylinder and rod connected to the arm, said actuator configured so as to ensure that a movement of the arm is such that an extent of an actuator stroke enables the end of the arm, provided with the hitching means, to successively sweep across a minimum bottom first position, a maximum top second position, and a retracted third position in which the arm is folded against the chassis;
    supply means (9, 10, 10a, 10b) for supplying the actuator;
    detecting means (C) for detecting a position of the end of the arm, said detecting means configured to deactivate the supply means when the end of the arm has reached the maximum top second position; and
    a by-pass control (R), comprised of a switch with a stable position and an unstable position, wherein said switch when in the unstable position deactivates the detecting means so that the supply means causes the actuator to advance the end of the arm to the retracted third position.

2. The device for hitching and lifting an agricultural tool according to claim 1, wherein the detecting means include an induction sensor.

3. The device for hitching and lifting an agricultural tool according to claim 2,
    wherein the supply means comprise a hydraulic distributor (9) connected to chambers of the actuator, and a first valve interposed in a line connected to one of the chambers which, when supplied, causes the actuator to advance the end of the arm to the retracted third position, and
    wherein a closing of said first valve is actuated by the detecting means, and an opening of said first valve is actuated by the by-pass control.

4. The device for hitching and lifting an agricultural tool according to claim 1, wherein the detecting means comprise an angular position sensor.

5. The device for hitching and lifting an agricultural tool according to claim 4,
    wherein the supply means comprise a hydraulic distributor (9) connected to chambers of the actuator, and a first valve interposed in a line connected to one of the chambers which, when supplied, causes the actuator to advance the end of the arm to the retracted third position, and
    wherein a closing of said first valve is actuated by the detecting means, and an opening of said first valve is actuated by the by-pass control.

6. The device for hitching and lifting an agricultural tool according to claim 1,
    wherein the supply means comprise a hydraulic distributor (9) connected to chambers of the actuator, and a first valve interposed in a line connected to one of the chambers which, when supplied, causes the actuator to advance the end of the arm to the retracted third position, and
    wherein a closing of said first valve is actuated by the detecting means, and an opening of said first valve is actuated by the by-pass control.

7. The device for hitching and lifting a tool according to claim 4, wherein said actuator is a first actuator, and wherein the device further comprises:
    a second arm (2') extending in a plane substantially parallel to a plane in which the first arm extends, said second arm being hinged to the chassis and including at an end thereof a second means for hitching the tool (8'); and
    a second actuator (4') connected to said second arm, said second actuator configured so as to ensure that a movement of the second arm is such that an extent of a stroke of the second actuator enables the end of the second arm to successively sweep across the minimum bottom first position, the maximum top second position, and the retracted third position in which the second arm is folded against the chassis.

8. The device for hitching and lifting a tool according to claim 7, wherein a single hydraulic distributor supplies both the first and second actuators in parallel by means of first and second lines, each of said first and second lines being divided at respective dividing points into respective pairs of sub-lines extending to respective ones of the first and second actuators.

9. The device according to claim 8, wherein the first valve (10) is disposed between the dividing points and the hydraulic distributor, such that closing the first valve by the detecting means stops supply to both said first and second actuators.

10. The device according to claim 8, wherein the first valve (10a) is disposed in one of the sub-lines extending to a chamber of the first actuator that enables switching the first actuator from a hitching position to the retracted third position, and a second valve (10b) is disposed in another one of the sub-lines, said second valve being driven by second means (C') for detecting a position of the end of the second arm, and an opening of said second valve is actuated by means of the by-pass control.

11. The device for hitching and lifting an agricultural tool according to claim 1, wherein the supply means comprise a hydraulic distributor (9) connected to chambers of the actuator, said hydraulic distributor being controlled by a control unit (ECU) connected to the detecting means and the by-pass control.

12. The device for hitching and lifting an agricultural tool according to claim 11, wherein an actuating knob of the by-pass control is integrated to the control unit.

13. The device for hitching and lifting an agricultural tool according to claim 11, wherein a movement to raise the end of the arm to the retracted third position is caused by concomitantly actuating an actuating knob of the by-pass control and one of i) a raise control of the control unit and ii) a manual control of the hydraulic distributor.

14. A method for controlling a device for hitching and lifting a tool, the device being capable of being mounted to an agricultural machine and equipped with
  a chassis (1) to be attached to the agricultural machine,
  an arm (2) hinged to the chassis and including, at an end of thereof, a hitching means (8) for hitching the tool,
    an actuator (4) comprised of a cylinder and rod, a first one of said cylinder and rod connected to the chassis, and a second one of said cylinder and rod connected to the arm, said actuator configured so as to ensure that a movement of the arm is such that an extent of an actuator stroke enables the end of the arm, provided with the first hitching means, to successively sweep across a minimum bottom first position, a maximum top second position, and a retracted third position in which the arm is folded against the chassis,
  supply means (9, 10) for supplying the actuator,
    detecting means (C) for detecting the position of the end of the arm, said detecting means configured to deactivate the supply means when the end of the arm has reached the maximum top second position, and
  a by-pass control (R) comprised of a switch with a stable position and an unstable position, wherein said switch when in the unstable position deactivates the detecting means so that the supply means causes the actuator to advance the end of the arm to the retracted third position, the method comprising:
    at the detecting means, deactivating the supply means in a direction of the retracted third position, as soon as the end of the arm, coming from a hitching position, reaches the maximum top second position; and
    reactivating the supply means in the direction of the retracted third position when the by-pass control is actuated via the unstable position.

15. The control method according to claim 14, wherein reactivating the supply means in the direction of the retracted third position is operated by concomitantly actuating the by-pass control and a control of the supply means in the direction of the retracted third position.

16. The control method according to claim 14, wherein the supply means comprise a hydraulic distributor (9) connected to chambers of the actuator, and a first valve interposed in a line connected to one of the chambers which, when supplied, causes the actuator to advance the end of the arm to the retracted third position,
  wherein a closing of said first valve occurs when an angular sensor of the detecting means detects that the end of the arm has reached the maximum top second position or when an induction sensor of the detecting means detects that the actuator stroke has reached a calibrated value corresponding to the maximum top first position of the end of the arm, an opening of said first valve being operated by actuating the by-pass control.

17. The control method according to claim 14,
  wherein the supply means comprise a hydraulic distributor (9) connected to chambers of the actuator, said hydraulic distributor being controlled by a control unit (ECU), the control unit (ECU) configured to control a deactivating of supply by the hydraulic distributor of a line connected to one of said chambers that when supplied causes the actuator to advance the end of the arm to the retracted third position, when a signal is received from an induction sensor of the detecting means that senses the actuator stroke or when a signal is received from an angular sensor of the detecting means that senses the position of the end of the arm, and
  wherein the reactivating the supply means is carried out by simultaneously actuating the by-pass control and a supply knob of the actuator in the direction of the retracted third position.

* * * * *